US012792561B2

United States Patent

(12) United States Patent
Day et al.

(10) Patent No.: US 12,792,561 B2
(45) Date of Patent: Nov. 10, 2026

(54) METHODS AND SYSTEMS FOR EXTERNAL MIGRATION COLLABORATION

(71) Applicant: Box, Inc., Redwood City, CA (US)

(72) Inventors: Kevin Day, Shelburne Falls, MA (US); Nathan Trueblood, Pleasanton, CA (US); Tamar Bercovici, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 17/865,622

(22) Filed: Jul. 15, 2022

(65) Prior Publication Data

US 2024/0020266 A1 Jan. 18, 2024

(51) Int. Cl.
*G06F 16/11* (2019.01)
*G06F 16/182* (2019.01)

(52) U.S. Cl.
CPC .......... *G06F 16/119* (2019.01); *G06F 16/122* (2019.01); *G06F 16/182* (2019.01)

(58) Field of Classification Search
CPC ..... G06F 16/119; G06F 16/122; G06F 16/182
See application file for complete search history.

(56) References Cited

U.S. PATENT DOCUMENTS

| | | | | |
|---|---|---|---|---|
| 2013/0339605 A1* | 12/2013 | Factor | ...................... | G06F 16/10 711/170 |
| 2021/0165759 A1* | 6/2021 | Bar-Nissan | ........... | G06F 16/119 |
| 2022/0114150 A1* | 4/2022 | Saurabh | ................ | H04L 9/3239 |

* cited by examiner

*Primary Examiner* — Aleksandr Kerzhner
*Assistant Examiner* — Samuel C Sharpless, III
(74) *Attorney, Agent, or Firm* — Sheridan Ross P.C.

(57) ABSTRACT

Embodiments of the disclosure provide systems and methods for identifying collaborators on migrated content and determining which, if any, of those collaborators should be allowed access to the content on the target system of that migration. According to one embodiment, a method for migrating content and a plurality of collaborators on the content from a source system to a target system can comprise initiating, by a migration control system, migration of the content from the source system to the target system and analyzing, by the migration control system, while the migration is being conducted, the content being migrated from the source system to the target system. One or more policies can be applied to the content and the plurality of collaborators on the content being migrated from the source system to the target system by the migration control system while the migration is being conducted.

18 Claims, 7 Drawing Sheets

METHODS AND SYSTEMS FOR EXTERNAL MIGRATION COLLABORATION

FIELD OF THE DISCLOSURE

Embodiments of the present disclosure relate generally to methods and systems for migrating data and user accounts from a source system to a target system and more particularly to identifying collaborators on that content and determining which, if any, of those collaborators should be allowed access to the content on the target system.

BACKGROUND

It is common for users of computing systems to periodically wish to move their data between systems. For example, a corporation of other entity may decide to move their data and user accounts from an on-premise server to a cloud-based system or from one service provider of a cloud-based system to another. Once the content has been migrated from the source system to the target system, users who previously were able to access that content on the source system will no longer be able to do so and will need to access the target system. In current systems, this typically requires that new accounts be created for those users and access permissions be granted to the content. However, there is no current approach that automatically applies security and other considerations to selectively migrate these users from the source system to the target system. Hence, there is a need for improved methods and systems for identifying collaborators on migrated content and determining which, if any, of those collaborators should be allowed access to the content on the target system of that migration.

BRIEF SUMMARY

Embodiments of the disclosure provide systems and methods for identifying collaborators on migrated content and determining which, if any, of those collaborators should be allowed access to the content on the target system of that migration. According to one embodiment, a method for migrating content and a plurality of collaborators on the content from a source system to a target system can comprise initiating, by a migration control system, migration of the content from the source system to the target system, wherein the migration of the content from the source system to the target system comprises moving electronic files from a file system of the source system to a file system of the target system via one or more communications networks, and analyzing, by the migration control system, while the migration is being conducted, the content being migrated from the source system to the target system. One or more policies can be applied to the content and the plurality of collaborators on the content being migrated from the source system to the target system by the migration control system while the migration is being conducted.

According to one embodiment, analyzing the content being migrated from the source system to the target system and applying the one or more policies to the content and the plurality of collaborators on the content being migrated from the source system to the target system can be performed before any of the content is migrated to the target system. Additionally, or alternatively, analyzing the content being migrated from the source system to the target system and applying the one or more policies to the content and the plurality of collaborators on the content being migrated from the source system to the target system can be performed after at least some of the content is migrated to the target system.

Analyzing the content being migrated from the source system to the target system can comprise analyzing a context of the content. Additionally, or alternatively, analyzing the content being migrated from the source system to the target system can comprise analyzing usage of the content by one or more collaborators of the plurality of collaborators. In some cases, analyzing the content being migrated from the source system to the target system can additionally, or alternatively, comprise analyzing a cluster of related collaborators the plurality of collaborators. Additionally, or alternatively, analyzing the content being migrated from the source system to the target system can comprise analyzing sharing of the content by one or more collaborators of the plurality of collaborators.

Applying the one or more policies to the content and the plurality of collaborators on the content being migrated from the source system to the target system can further comprise identifying, by the migration control system, each of the plurality of collaborators on the content being migrated from the source system to the target system and distinguishing, by the migration control system, each of the plurality of collaborators as a collaborator within one or more predefined domains or as a collaborator outside of the one or more predefined domains. A report on a proposed migration of one or more collaborators of the plurality of collaborators can be generated, by the migration control system, based on the one or more policies and a determination can be made, by the migration control system, as to whether the proposed migration is accepted. In response to determining the proposed migration is accepted the one or more collaborators of the plurality of collaborators can be migrated from the source system to the target system based on the one or more policies. In response to determining the proposed migration is not acceptable, a determination can be made, by the migration control system, as to whether there are changes to the proposed migration. In response to determining there are changes to the proposed migration, changes to the proposed migration can be received, by the migration control system, and the one or more collaborators of the plurality of collaborators can be migrated from the source system to the target system based on the one or more policies and the received changes. The moving of the electronic files from the file system of the source system to the file system of the target system via the one or more communications networks can then be completed based on the applying of the one or more policies to the content and the plurality of collaborators on the content.

According to another embodiment, a system can comprise a processor and a memory coupled with and readable by the processor. The memory can store therein a set of instructions which, when executed by the processor, causes the processor to migrate content and collaborators on the content from a source system to a target system by initiating migration of the content from the source system to the target system, wherein the migration of the content from the source system to the target system comprises moving electronic files from a file system of the source system to a file system of the target system via one or more communications networks, analyzing, while the migration is being conducted, the content being migrated from the source system to the target system, and applying, while the migration is being conducted, one or more policies to the content and the plurality of collaborators on the content being migrated from the source system to the target system.

Analyzing the content being migrated from the source system to the target system and applying the one or more policies to the content and the plurality of collaborators on the content being migrated from the source system to the target system can be performed before any of the content is migrated to the target system and/or after at least some of the content is migrated to the target system. According to one embodiment, analyzing the content being migrated from the source system to the target system can comprise and one or more of analyzing a context of the content, analyzing usage of the content by one or more collaborators of the plurality of collaborators, analyzing a cluster of related collaborators the plurality of collaborators, and/or analyzing sharing of the content by one or more collaborators of the plurality of collaborators.

Applying the one or more policies to the content and the plurality of collaborators on the content being migrated from the source system to the target system can comprise identifying each of the plurality of collaborators on the content being migrated from the source system to the target system, distinguishing each of the plurality of collaborators as a collaborator within one or more predefined domains or as a collaborator outside of the one or more predefined domains, and generating a report on a proposed migration of one or more collaborators of the plurality of collaborators based on the one or more policies. A determination can be made as to whether the proposed migration is accepted. In response to determining the proposed migration is accepted, the one or more collaborators of the plurality of collaborators can be migrated from the source system to the target system based on the one or more policies. In response to determining the proposed migration is not acceptable, a further determination can be made as to whether there are changes to the proposed migration. In response to determining there are changes to the proposed migration, the changes to the proposed migration can be received and the one or more collaborators of the plurality of collaborators can be migrated from the source system to the target system based on the one or more policies and the received changes. The moving of the electronic files from the file system of the source system to the file system of the target system via the one or more communications networks can then be completed based on the applying of the one or more policies to the content and the plurality of collaborators on the content.

According to yet another embodiment, a non-transitory, computer-readable medium can comprise a set of instructions stored therein which, when executed by a processor, causes the processor to migrate content and collaborators on the content from a source system to a target system by initiating migration of the content from the source system to the target system. analyzing while the migration is being conducted, the content being migrated from the source system to the target system, wherein the migration of the content from the source system to the target system comprises moving electronic files from a file system of the source system to a file system of the target system via one or more communications networks, and applying, while the migration is being conducted, one or more policies to the content and the plurality of collaborators on the content being migrated from the source system to the target system. Analyzing the content being migrated from the source system to the target system and applying the one or more policies to the content and the plurality of collaborators on the content being migrated from the source system to the target system can be performed before any of the content is migrated to the target system and/or after at least some of the content is migrated to the target system.

Applying the one or more policies to the content and the plurality of collaborators on the content being migrated from the source system to the target system can comprise identifying each of the plurality of collaborators on the content being migrated from the source system to the target system, distinguishing each of the plurality of collaborators as a collaborator within one or more predefined domains or as a collaborator outside of the one or more predefined domains, and generating a report on a proposed migration of one or more collaborators of the plurality of collaborators based on the one or more policies. A determination can be made as to whether the proposed migration is accepted. In response to determining the proposed migration is accepted, the one or more collaborators of the plurality of collaborators can be migrated from the source system to the target system based on the one or more policies. In response to determining the proposed migration is not acceptable, a further determination can be made as to whether there are changes to the proposed migration. In response to determining there are changes to the proposed migration, the changes to the proposed migration can be received and the one or more collaborators of the plurality of collaborators can be migrated from the source system to the target system based on the one or more policies and the received changes. The moving of the electronic files from the file system of the source system to the file system of the target system via the one or more communications networks can then be completed based on the applying of the one or more policies to the content and the plurality of collaborators on the content.

Figure 1:
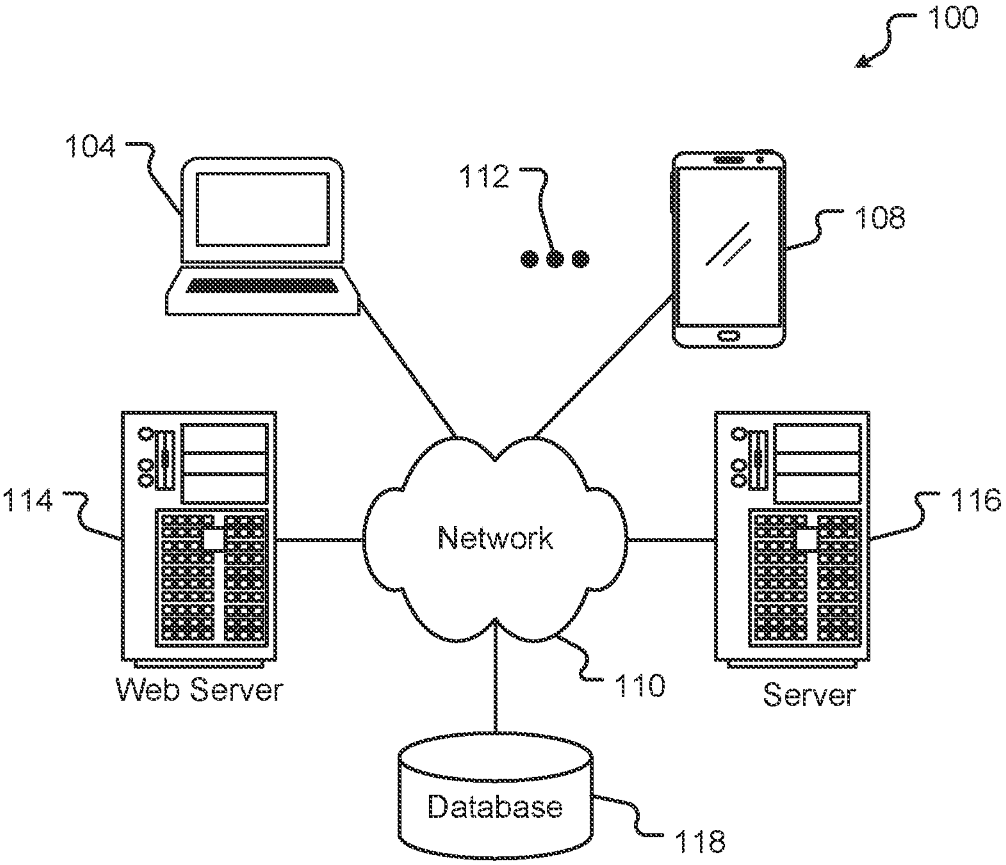
FIG. 1 is a block diagram illustrating elements of an exemplary computing environment in which embodiments of the present disclosure may be implemented.

In the appended FIGURES, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the FIGURES. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 may be a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
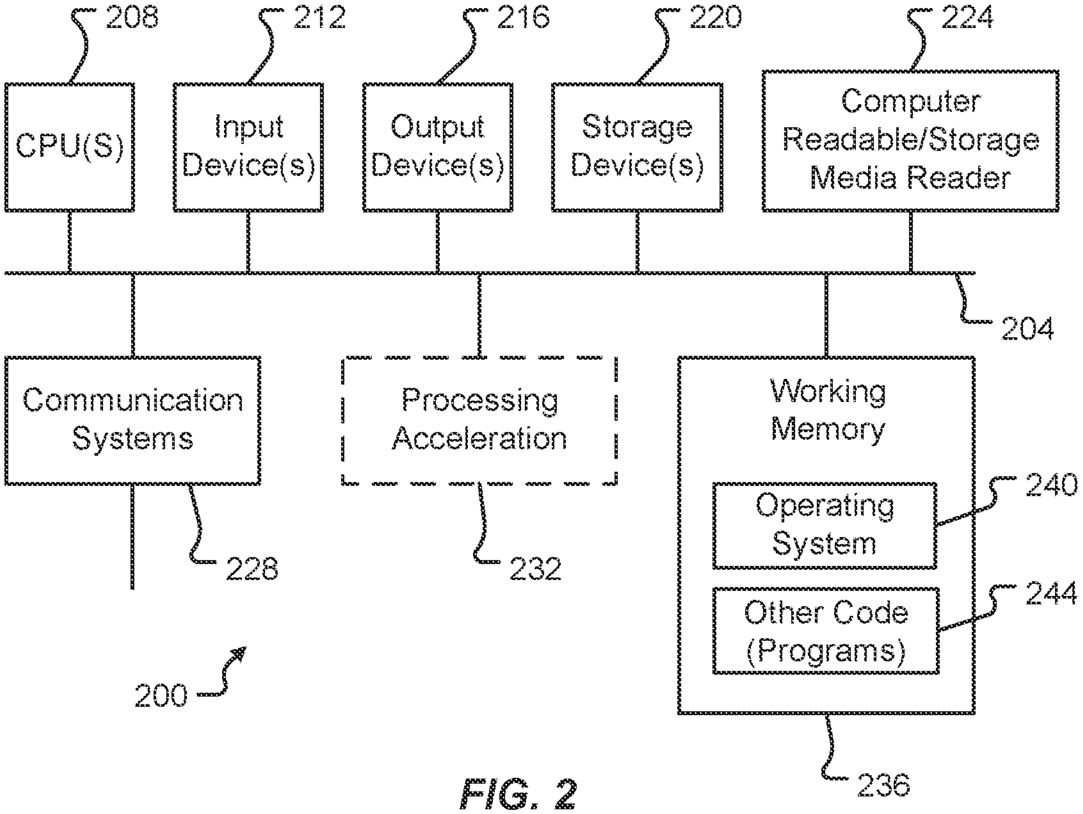
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3A:
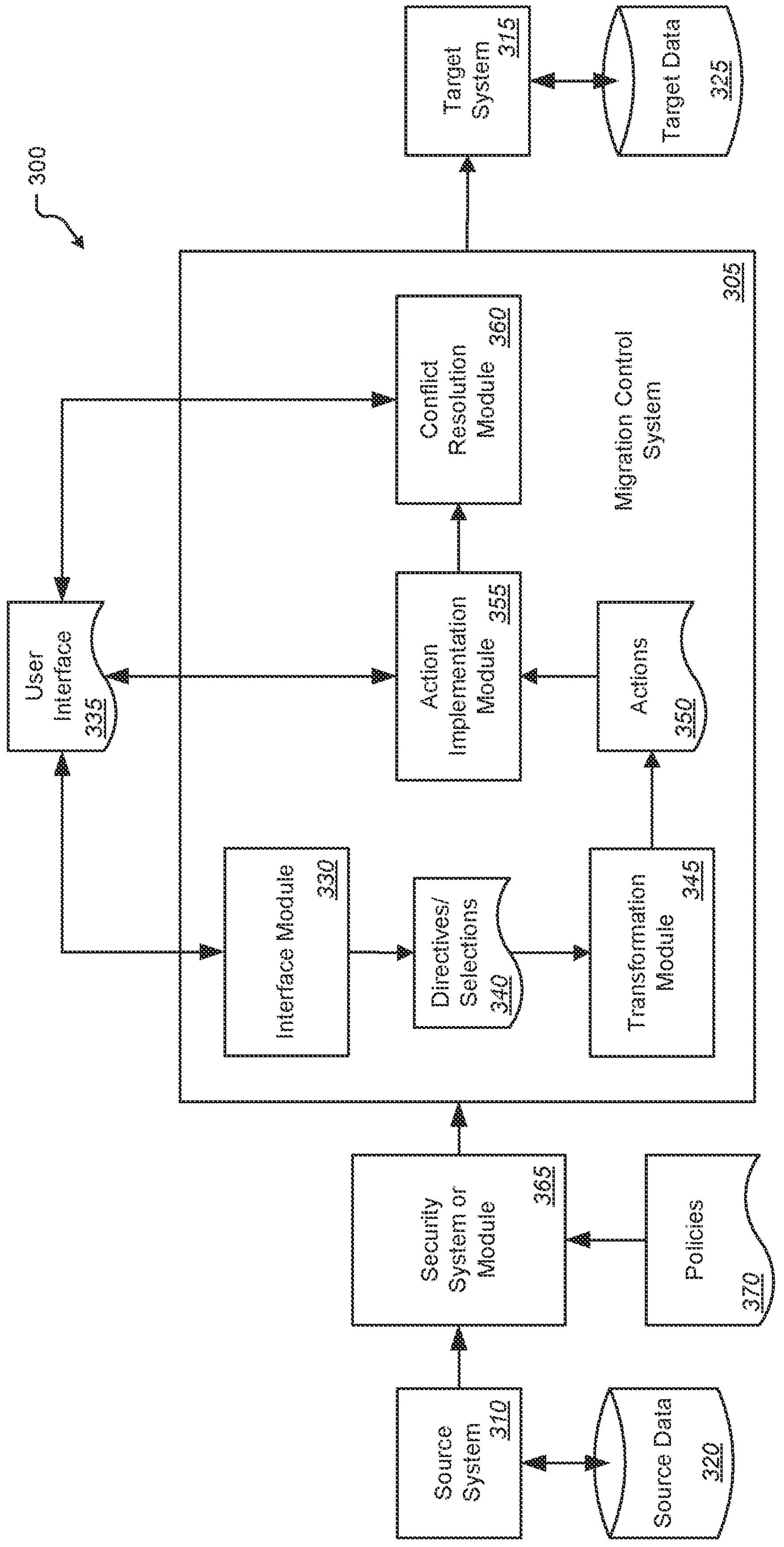
FIG. 3A is a block diagram illustrating exemplary components of an environment in which migration of data between systems can be performed according to one embodiment of the present disclosure.

FIG. 3A is a block diagram illustrating exemplary components of an environment in which migration of data between systems can be performed according to one embodiment of the present disclosure. As illustrated in this example, the environment 300 can include a migration control system 305 as may be implemented on any one or more servers and/or other computing devices such as described above. The migration control system 305 can be communicatively coupled with a source system 310 via any one or more wired and/or wireless communications networks as described above. The source system 310 can comprise any one or more servers and/or other computing devices as described above and can be a cloud-based system or a on-premise system. The migration control system 305 can also be communicatively coupled with a target system 315 via any one or more wired and/or wireless communications networks as described above. The target system 315 can comprise any one or more servers and/or other computing devices as described above. According to one embodiment, the target system 315 can comprise a cloud-based system. The source system 310 can maintain a set of source data 320 which can comprise, for example, a set of data objects such as files and folders accessible to users and/or groups of users of the source system 310. Generally speaking, the migration control system 305 can provide for migration of the source data 320 to a set of target data 325 of the target system 315. This migration can be performed in a self-service manner, i.e., can be performed by users of the source system 310 and/or target system 315 in a manner that does not require specialized knowledge or programming skill. The migration of the content from the source system to the target system can comprise moving electronic files from a file system of the source system to a file system of the target system via one or more communications networks More specifically, the migration control system 305 can comprise an interface module 330 presenting a user interface 335 through which a user may define one or more directives and/or selections for the migration process. The interface module 330 can receive such a set of directives and/or selections 340 which can include, but are not limited to a selection of the source system 310, a selection of the target system 315, and/or a selection of a conflict resolution strategy. As will be described further below, the migration control system can further automatically identify and resolve permission conflicts that develop during the migration. A conflict resolution strategy may be selected by the user through the user interface 335. The strategy may be selected from a plurality of conflict resolution strategies that can include, but are not limited to, an expansive, restrictive, or warn-and-skip strategy as will be described below.

A transformation module 345 of the migration control system 305 can then perform path mapping based on the received directives and/or selections 340. Generally speaking, path mapping can comprise identifying, e.g., based on selection 340 received through the user interface 335 of the migration control system 305, some or all user accounts, data objects, e.g., files and/or folders, of the source system 310 to be migrated, and locations for the migrated data on the target systems 315, and/or target user accounts on the target system. In some cases, the path mapping may specify that certain data objects on the source system, e.g., descendant files or folders of selections, should be skipped in the migration. Additionally, or alternatively, the path mapping may specify that certain data objects on the source system may be redirected in the migration. For example, the path mapping may specify that certain data objects on the source system e.g., descendant files or folders of selections, should be redirected to a different target location on the target system than implied by the ancestor mapping. These mappings can be represented in a set of actions 350 generated by the transformation module 345.

Based on these actions 350, an action implementation module 355 of the migration control system 305 can examine the source. Source examination can include, but is not limited to, capturing metadata from the source system 310 for all path mapping selections, e.g., properties such as size, last modified time, author, etc., identifying permissions e.g., sharee (user and/or group), role and/or rights, etc., and/or possibly performing content analysis, depending upon the type of source system, to identify, for example, links to other files, password protection, etc. Subjects may also be listed. Generally speaking, subject listing can comprise creating a list of distinct sharees and authors found in the results of source examination. Examination errors, if any, can also be displayed in the user interface 335 by the action implementation module 355. Displaying examination errors can include creating and presenting a list of source locations that were inaccessible during source examination.

Subject mapping can then be performed by the transformation module 345. Subject mapping can be based on the received selections 340 which can identify and map a user and/or group on the source system 310 to a user and/or group on the target system 315. In some cases, the received selections can mark one or more users and/or groups of the source system 310 to be skipped in the migration. This can result in the action implementation module 355 skipping any permissions involving these users or groups, and/or automatically determining a valid replacement author for any files where these users and/or groups are authors.

Permissions conflict identification and resolution can then be performed by a conflict resolution module 360 of the migration control system 305. Generally speaking, permissions conflict identification and resolution can comprise translating source permissions to proposed target permissions using provided mappings, determining which proposed target permissions cannot be represented on the target system 315 due to capability limitations and thereby represent a permissions conflict, and applying a selected conflict resolution strategy to the determined permissions conflicts to produce a new set of proposed target permissions. Examples of mapping errors can include, but are not limited to attempting to merge two source folders into the same target folder where the names of some files overlap, e.g., /project apollo/schedule.xlsx and /project mercury/schedule.xlsx both being mapped to /project archive/schedule.xlsx. Another example of a mapping error can be mapping a source user to a target user that does not exist. Mapping errors and any unresolvable permissions conflicts can be displayed by the conflict resolution module 360 through the user interface 335 of the migration control system 305.

When determining which permissions represent conflicts, the conflict resolution module 360 can take into account subject skipping of specified users and/or groups. Such users and/or groups can be specified as part of the selections 340 through the user interface 335. The conflict resolution module 360 can also take into account path mapping redirects. For example, if the root folder of source UserA was mapped to the root folder of target UserZ, but a subfolder of source UserA was redirected to a subfolder of target UserX the conflict resolution module 360 can identify and resolve this potential conflict. Additionally, or alternatively, the conflict resolution module 360 can also take into account group membership. For example, if a child folder has an explicit permission for a user with the viewer role, but also has an inherited group permission with the editor role, the conflict resolution module 360 can determine if the user is a member of the group to determine which conflict resolution strategy to use.

The conflict resolution strategies can include, but are not limited to, a warn-and-skip conflict resolution strategy, an expansive conflict resolution strategy, and/or a restrictive conflict resolution strategy. As the name suggests, the warn-and-skip conflict resolution strategy can comprise issuing a warning by the conflict resolution module 360 though the user interface 335 of the migration control system 305 and taking no further action to migrate that data or user to the target system 315.

Under the expansive conflict resolution strategy, the conflict resolution module 360 can add users or groups to a child file or folder until they match the permissions of the parent folder. The conflict resolution module 360 can copy the permissions from the parent to replace the permissions on the child. In effect, all explicit permission downgrades and removals are removed from the child. In the case where the expansion is a promotion (e.g., from viewer to editor), the lower permission user is removed from the child, and the same user is added with the promoted role. Any explicit child permissions that are not in conflict (e.g., adding a new user, or upgrading a role) are preserved.

Under the restrictive conflict resolution strategy, the conflict resolution module 360 can walk up the tree until it finds the path at which the permission in conflict is added, or to the root source file directory, whichever is first. The conflict resolution module 360 can then remove the permission there, and add the path to a reprocessing list. After the first processing, paths in the reprocessing list and their descendants can be walked by conflict resolution module 360 to determine if there are any new conflicts. Any new conflicts are managed by additional walks back up the tree, and subsequent walks back down. A limit can be placed on the number of iterations performed by the conflict resolution module 360. Note that this process can also apply if permissions are not being removed for a user or group completely, but instead, are changing the role that user or group has on the file or folder to a role with fewer privileges. So, if the permission specified a viewer role for a given user on a child folder, but there was a permission on the parent that specified the editor role for that same user, the conflict resolution module 360 can walk up the tree to the location of the explicit granting of the editor role, change that role to viewer, and then do the same walking iterations to propagate the change to affected descendants.

According to one embodiment, the environment 300 can further comprise a security system or module 365. Generally speaking, the security system or module 365 can be utilized by the migration control system 305 as part of the migration to apply one or more policies 370 to the content and collaborators being migrated from the source system 310 to the target system 315. In some cases, these policies 370 can define a migration model which can be used to identify content and collaborators related to that content and control how or if that content and/or those collaborators will be migrated.

It should be noted that while the security system or module is illustrated here as separate from the migration control system 305, it may in various embodiments be implemented, in whole or in part, on either the same or different physical and/or virtual servers or machines. According to one embodiment, the security system or module can be implemented according to the methods and systems described in co-owned U.S. Patent Pub. No. 2020/0092337 entitled "Context-Aware Content Object Security" which is incorporated herein in its entirety for all purposes.

According to one embodiment, migrating content and a plurality of collaborators on the content from a source system 310 to a target system 315 can comprise initiating, by the migration control system 305, migration of the content from the source system 310 to the target system 315 and analyzing, by the migration control system 305, while the migration is being conducted, the content being migrated. One or more policies 370 can be applied by the security system or module 365 to the content and the plurality of collaborators on the content being migrated. Analyzing the content and applying the one or more policies can be performed before any of the content is migrated to the target system 315 (as illustrated here), or after the content is migrated, in whole or in part. Analyzing the content being migrated from the source system to the target system can comprise any one or more of analyzing the content itself, analyzing a context of the content, analyzing usage of the content by one or more collaborators of the plurality of collaborators, analyzing a cluster of related collaborators the plurality of collaborators, and/or analyzing sharing of the content by one or more collaborators of the plurality of collaborators. Additional details of an exemplary process for migrating content and collaborators from the source system 310 to the target system 315 will be described below with reference to FIG. 4.

Figure 3B:
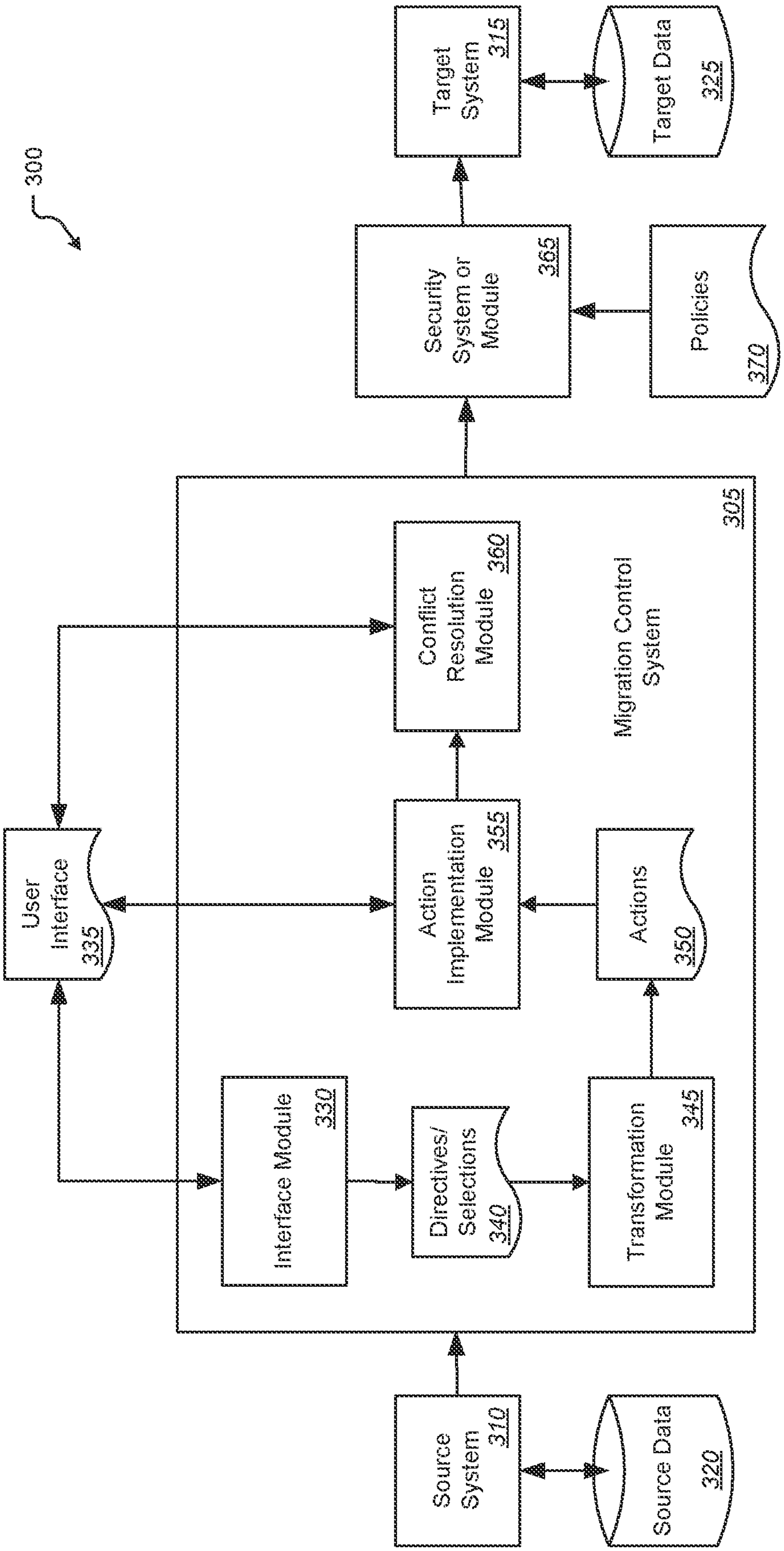
FIG. 3B is a block diagram illustrating exemplary components of an environment in which migration of data between systems can be performed according to another embodiment of the present disclosure.

FIG. 3B is a block diagram illustrating exemplary components of an environment in which migration of data between systems can be performed according to another embodiment of the present disclosure. According to one embodiment, analyzing the content being migrated from the source system 310 to the target system 315 and applying the one or more policies 370 to the content and the plurality of collaborators on the content being migrated can be performed before any of the content is migrated to the target system as described above with reference to FIG. 3A. Additionally, or alternatively, and as illustrated in FIG. 3B, analyzing the content being migrated from the source system 310 to the target system 315 and applying the one or more policies 370 to the content and the plurality of collaborators on the content being migrated can be performed by the security system or module 365 implemented as a backend process for the migration, i.e., after some or all of the content is migrated to the target system 315. That is, application of the policies 370 can be performed at any or all stages of the migration, i.e., before, during, or after some or all of the content has been migrated from the source system 310 to the target system 315.

Figure 4:
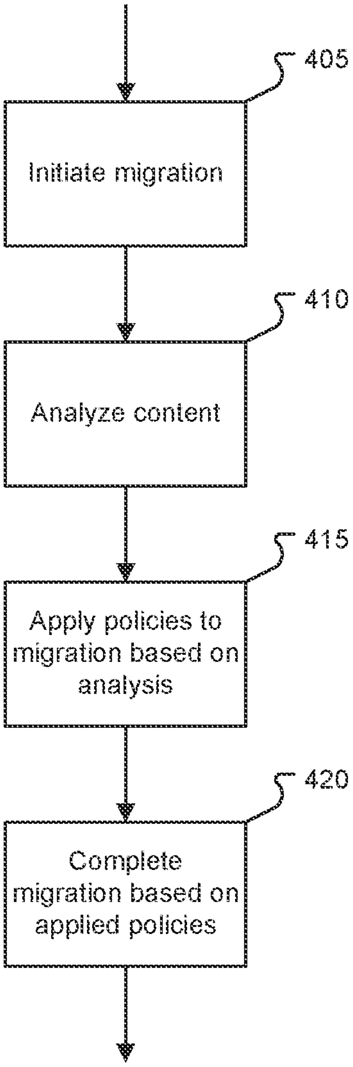
FIG. 4 is a flowchart illustrating at a high level an exemplary process for migrating content and collaborators on the content from a source system to a target system according to one embodiment of the present disclosure.

FIG. 4 is a flowchart illustrating at a high level an exemplary process for migrating content and collaborators on the content from a source system to a target system according to one embodiment of the present disclosure. As illustrated in this example, migrating content and a plurality of collaborators on the content from a source system 310 to a target system 315 as may be performed by a migration control system 305 as described above can comprise initiating 405 migration of the content from the source system 310 to the target system 315, wherein the migration of the content from the source system to the target system comprises moving electronic files from a file system of the source system to a file system of the target system via one or more communications networks, and analyzing 410, while the migration is being conducted, the content being migrated from the source system 310 to the target system 315. One or more policies 370 can be applied 415 to the content and the plurality of collaborators on the content being migrated from the source system 310 to the target system 315 while the migration is being conducted. As noted above, analyzing 410 the content being migrated from the source system 310 to the target system and applying 415 the one or more policies 370 to the content and the plurality of collaborators on the content being migrated from the source system to the target system can be performed before any of the content is migrated to the target system 315 and/or after the content is migrated to the target system 315, in whole or in part. In any case, the moving of the electronic files from the file system of the source system to the file system of the target system via the one or more communications networks can then be completed 420 based on the applying of the one or more policies to the content and the plurality of collaborators on the content. Additional details of an exemplary process for applying 415 the one or more policies 370 to the content and collaborators being migrated will be described below with reference to FIG. 5 while additional details of an exemplary process for analyzing 410 the content being migrated will be described below with reference to FIG. 6.

Figure 5:
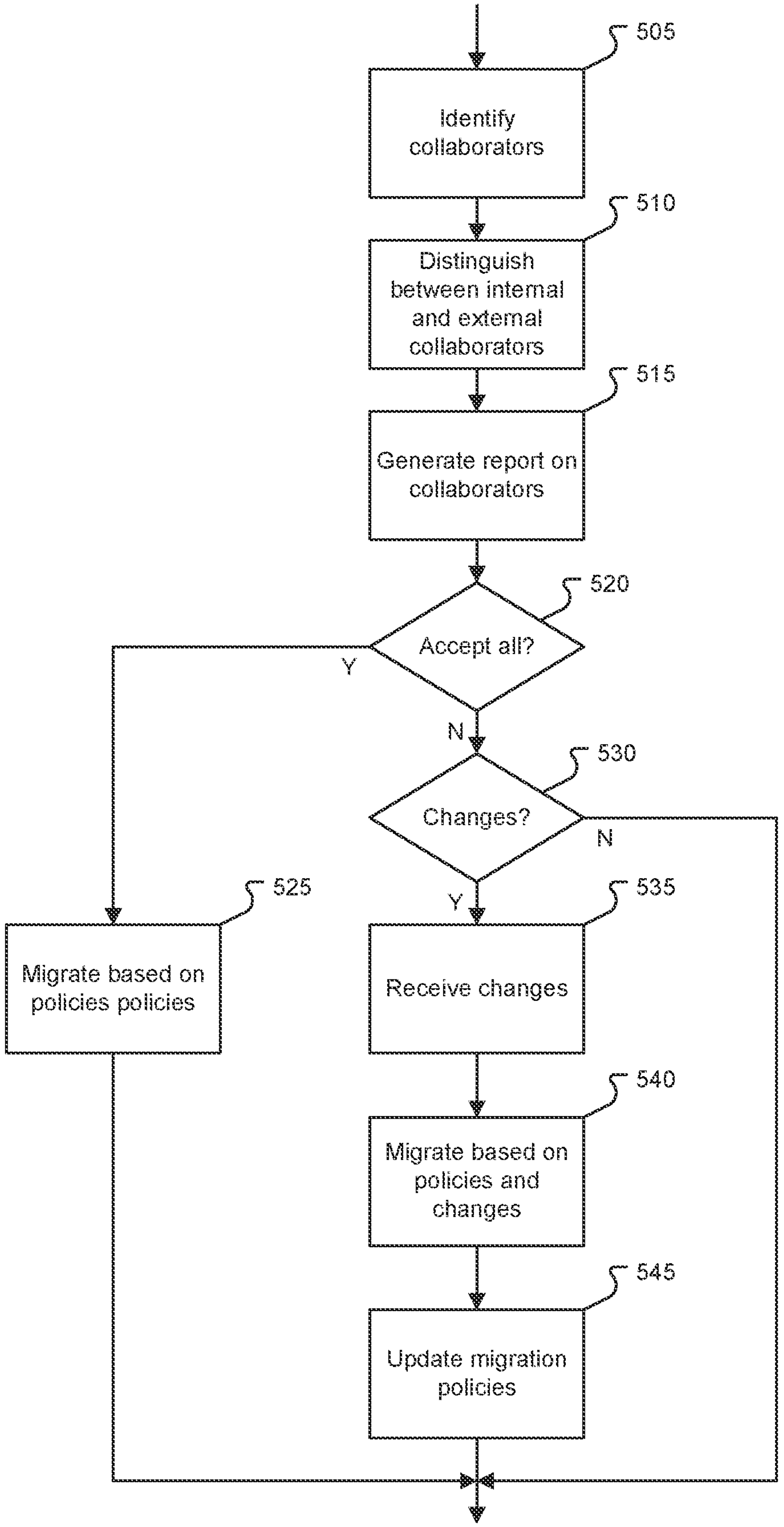
FIG. 5 is a flowchart illustrating additional details of a process for migrating content and collaborators on the content from a source system to a target system according to one embodiment of the present disclosure.

FIG. 5 is a flowchart illustrating additional details of a process for migrating content and collaborators on the content from a source system to a target system according to one embodiment of the present disclosure. As illustrated in this example, applying the one or more policies 370 to the content and the plurality of collaborators on the content being migrated from the source system 310 to the target system 315 as may be performed by the migration control system 305 as described above can further comprise identifying 505 each of the plurality of collaborators on the content being migrated from the source system 310 to the target system 315 and distinguishing 510 each of the plurality of collaborators as a collaborator within one or more predefined domains or as a collaborator outside of the one or more predefined domains.

A report on a proposed migration of one or more collaborators of the plurality of collaborators can be generated 515 based on the one or more policies 370 and a determination 520 can be made as to whether the proposed migration is accepted. That is, a proposed migration based on the analysis 410 of the content being migrated and the one or more policies can be determined and presented in a report. Such a report can be presented through a graphical user interface 335 as described above or in a similar manner. The report can identify each collaborator on the source system 310, indicate whether that collaborator is an internal collaborator, i.e., within the predefined domain(s), or an external collaborator, i.e., outside of the predefined domain(s), and whether the collaborator will be migrated to the target system 315 based on application of the one or more policies. Determining 520 whether the proposed migration is accepted can comprise receiving an indication of acceptance or rejection through the user interface 335. Additionally, or alternatively, determining 520 whether the proposed migration is accepted can be performed, in whole or in part, automatically based on further analysis of the proposed migration, e.g., by further analysis of security vulnerabilities that may exist on the target system 315 if the proposed migration is performed.

In response to determining 520 the proposed migration is accepted the one or more collaborators of the plurality of collaborators can be migrated 525 from the source system 310 to the target system 315 based on the one or more policies 370. In response to determining 520 the proposed migration is not acceptable, a determination 530 can be made as to whether there are changes to the proposed migration. In response to determining 530 there are changes to the proposed migration, changes to the proposed migration can be received 535 and the one or more collaborators of the plurality of collaborators can be migrated 540 from the source system to the target system based on the one or more policies and the received changes. According to one embodiment, the one or more policies may be updated 545 based on any received changes. That is, and as noted above, the policies can define a learned migration model. In such cases, machine learning can be performed on the migration model based on any changes made to proposed migration.

Figure 6:
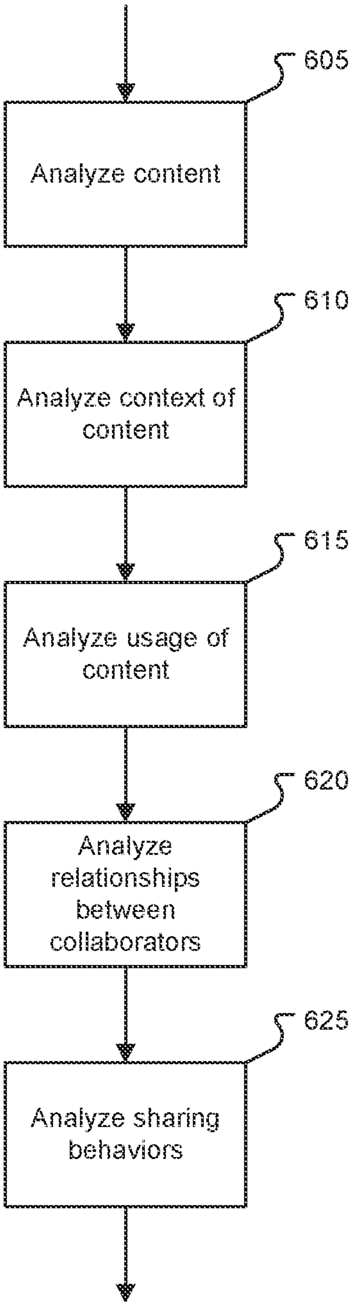
FIG. 6 is a flowchart illustrating additional details of a process for analyzing content being migrated from a source system to a target system according to one embodiment of the present disclosure.

FIG. 6 is a flowchart illustrating additional details of a process for analyzing content being migrated from a source system to a target system according to one embodiment of the present disclosure. As illustrated in this example, and according to one embodiment, analyzing 410 the content being migrated from the source system 310 to the target system 315 can comprise analyzing 605 the content itself. Analyzing 605 the content itself can comprise applying a policy-based or other security review on the content. In some cases, if the content is found to be sensitive or restricted in this security review, it may be migrated to a predefined restricted location on the target system. Additionally, or alternatively, analyzing 605 the content itself can comprise classifying the content based on a file type, a content type, information withing the content, etc.

Analyzing 410 the content being migrated from the source system 310 to the target system 315 can additionally, or alternatively, comprise analyzing 610 a context of the content. According to one embodiment, analyzing a context of the content can be performed by processes that operate within or in conjunction with framework of a cloud-based environment to handle the processing of particular content items, using one or more data processing technologies to derive or extract a particular insight or some other information associated with the content item. As an illustrative example, an OCR module may be configured to process images of documents (e.g., in .pdf format) uploaded to a cloud-based collaboration platform to identify and extract textual information. Details of exemplary systems and methods for analyzing the context of content items are described in co-owned U.S. Pat. No. 10,867,209 entitled "Combining Outputs of Data Processing Services in a Cloud-Based Collaboration Platform" which is incorporated herein by reference in its entirety and for all purposes. Various policies 370 may be defined to treat content and collaborators differently based on the context for the content.

Additionally, or alternatively, analyzing 410 the content being migrated from the source system 310 to the target system 315 can comprise analyzing 615 usage of the content by one or more collaborators of the plurality of collaborators. For example, the frequency, recency, and type of access, e.g., read, modify, create, etc., can be analyzed. Various policies 370 can be defined to migrate collaborators differently based on such usages.

In some cases, analyzing 410 the content being migrated from the source system 310 to the target system 315 can additionally, or alternatively, comprise analyzing 620 a cluster of related collaborators the plurality of collaborators. For example, policies 370 can be defined to migrate groups of related collaborators similarly. These relationships can be identified, for example, according to systems and methods described in co-owned U.S. Pat. No. 10,747,786 entitled "Spontaneous Networking" which is incorporated herein by reference in its entirety and for all purposes.

Additionally, or alternatively, analyzing 410 the content being migrated from the source system 310 to the target system 315 can comprise analyzing 625 sharing of the content by one or more collaborators of the plurality of collaborators. For example, the content can be analyzed to determine who shares the content and with whom, how frequently, how recently, etc. Policies 370 can be defined to migrate collaborators based on this analysis.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for migrating content and a plurality of collaborators on the content from a source system to a target system, the method comprising:

initiating, by a migration control system, migration of the content and the plurality of collaborators from the source system to the target system, wherein the migration of the content and the plurality of collaborators from the source system to the target system comprises moving electronic files from a file system of the source system to a file system of the target system via one or more communications networks and moving one or more existing user accounts associated with the plurality of collaborators on the source system to the target system and wherein the plurality of collaborators comprise one or more internal collaborators within one or more predefined domains and at least one external collaborator outside of the one or more predefined domains;

analyzing, by the migration control system, while the migration is being conducted, the content being migrated from the source system to the target system, wherein analyzing the content being migrated from the source system to the target system comprises analyzing usage of the content by one or more collaborators of the plurality of collaborators for frequency of access, type of access, and recency of access;

applying, by the migration control system, while the migration is being conducted, one or more policies to the content and the plurality of collaborators on the content being migrated from the source system to the target system; and completing, by the migration control system, the moving of the electronic files and the one or more user accounts associated with the plurality of collaborators from the file system of the source system to the file system of the target system via the one or more communications networks based on the applying of the one or more policies to the content and the plurality of collaborators on the content.

2. The method of claim 1, wherein analyzing the content being migrated from the source system to the target system and applying the one or more policies to the content and the plurality of collaborators on the content being migrated from the source system to the target system are performed before any of the content is migrated to the target system.

3. The method of claim 1, wherein analyzing the content being migrated from the source system to the target system and applying the one or more policies to the content and the plurality of collaborators on the content being migrated from the source system to the target system are performed after at least some of the content is migrated to the target system.

4. The method of claim 1, wherein analyzing the content being migrated from the source system to the target system comprises analyzing a context of the content.

5. The method of claim 1, wherein analyzing the content being migrated from the source system to the target system comprises analyzing a cluster of related collaborators of the plurality of collaborators.

6. The method of claim 1, wherein analyzing the content being migrated from the source system to the target system comprises analyzing sharing of the content by one or more collaborators of the plurality of collaborators.

7. The method of claim 1, wherein applying the one or more policies to the content and the plurality of collaborators on the content being migrated from the source system to the target system further comprises:

identifying, by the migration control system, each of the plurality of collaborators on the content being migrated from the source system to the target system;

distinguishing, by the migration control system, each of the plurality of collaborators as a collaborator within the one or more predefined domains or as a collaborator outside of the one or more predefined domains;

generating, by the migration control system, a report on a proposed migration of one or more collaborators of the plurality of collaborators based on the one or more policies;

determining, by the migration control system, whether the proposed migration is accepted;

in response to determining the proposed migration is accepted, migrating, by the migration control system, the one or more collaborators of the plurality of collaborators from the source system to the target system based on the one or more policies; and in response to determining the proposed migration is not acceptable, determining, by the migration control system, whether there are changes to the proposed migration and in response to determining there are changes to the proposed migration, receiving, by the migration control system, the changes to the proposed migration and migrating, by the migration control system, the one or more collaborators of the plurality of collaborators from the source system to the target system based on the one or more policies and the received changes.

8. A system comprising:

a processor; and a memory coupled with and readable by the processor and storing therein a set of instructions which, when executed by the processor, causes the processor to migrate content and collaborators on the content from a source system to a target system by:

initiating migration of the content and the plurality of collaborators from the source system to the target system, wherein the migration of the content and the plurality of collaborators from the source system to the target system comprises moving electronic files from a file system of the source system to a file system of the target system via one or more communications networks and moving one or more existing user accounts associated with the plurality of collaborators on the source system to the target system and wherein the plurality of collaborators comprise one or more internal collaborators within one or more predefined domains and at least one external collaborator outside of the one or more predefined domains;

analyzing while the migration is being conducted, the content being migrated from the source system to the target system, wherein analyzing the content being migrated from the source system to the target system comprises analyzing usage of the content by one or more collaborators of the plurality of collaborators for frequency of access, type of access, and recency of access;

applying, while the migration is being conducted, one or more policies to the content and the plurality of collaborators on the content being migrated from the source system to the target system; and completing the moving of the electronic files and the one or more user accounts associated with the plurality of collaborators from the file system of the source system to the file system of the target system via the one or more communications networks based on the applying of the one or more policies to the content and the plurality of collaborators on the content.

9. The system of claim 8, wherein analyzing the content being migrated from the source system to the target system and applying the one or more policies to the content and the plurality of collaborators on the content being migrated from the source system to the target system are performed before any of the content is migrated to the target system.

10. The system of claim 8, wherein analyzing the content being migrated from the source system to the target system and applying the one or more policies to the content and the plurality of collaborators on the content being migrated from the source system to the target system are performed after at least some of the content is migrated to the target system.

11. The system of claim 8, wherein analyzing the content being migrated from the source system to the target system comprises analyzing a context of the content.

12. The system of claim 8, wherein analyzing the content being migrated from the source system to the target system comprises analyzing a cluster of related collaborators the plurality of collaborators.

13. The system of claim 8, wherein analyzing the content being migrated from the source system to the target system comprises analyzing sharing of the content by one or more collaborators of the plurality of collaborators.

14. The system of claim 8, wherein applying the one or more policies to the content and the plurality of collaborators on the content being migrated from the source system to the target system further comprises:

identifying each of the plurality of collaborators on the content being migrated from the source system to the target system;

distinguishing each of the plurality of collaborators as a collaborator within the one or more predefined domains or as a collaborator outside of the one or more predefined domains;

generating a report on a proposed migration of one or more collaborators of the plurality of collaborators based on the one or more policies;

determining whether the proposed migration is accepted;

in response to determining the proposed migration is accepted, migrating the one or more collaborators of the plurality of collaborators from the source system to the target system based on the one or more policies; and in response to determining the proposed migration is not acceptable, determining whether there are changes to the proposed migration and in response to determining there are changes to the proposed migration, receiving the changes to the proposed migration and migrating the one or more collaborators of the plurality of collaborators from the source system to the target system based on the one or more policies and the received changes.

15. A non-transitory, computer-readable medium comprising a set of instructions stored therein which, when executed by a processor, causes the processor to migrate content and collaborators on the content from a source system to a target system by:

initiating migration of the content and the plurality of collaborators from the source system to the target system, wherein the migration of the content and the plurality of collaborators from the source system to the target system comprises moving electronic files from a file system of the source system to a file system of the target system via one or more communications networks and moving one or more existing user accounts associated with the plurality of collaborators on the source system to the target system and wherein the plurality of collaborators comprise one or more internal collaborators within one or more predefined domains and at least one external collaborator outside of the one or more predefined domains;

analyzing while the migration is being conducted, the content being migrated from the source system to the target system, wherein analyzing the content being migrated from the source system to the target system comprises analyzing usage of the content by one or more collaborators of the plurality of collaborators for frequency of access, type of access, and recency of access;

applying, while the migration is being conducted, one or more policies to the content and the plurality of collaborators on the content being migrated from the source system to the target system; and completing the moving of the electronic files and the one or more user accounts associated with the plurality of collaborators from the file system of the source system to the file system of the target system via the one or more communications networks based on the applying of the one or more policies to the content and the plurality of collaborators on the content.

16. The non-transitory, computer-readable medium of claim 15, wherein analyzing the content being migrated from the source system to the target system and applying the one or more policies to the content and the plurality of collaborators on the content being migrated from the source system to the target system are performed before any of the content is migrated to the target system.

17. The non-transitory, computer-readable medium of claim 15, wherein analyzing the content being migrated from the source system to the target system and applying the one or more policies to the content and the plurality of collaborators on the content being migrated from the source system to the target system are performed after at least some of the content is migrated to the target system.

18. The non-transitory, computer-readable medium of claim 15, wherein applying the one or more policies to the content and the plurality of collaborators on the content being migrated from the source system to the target system further comprises:

identifying each of the plurality of collaborators on the content being migrated from the source system to the target system;

distinguishing, each of the plurality of collaborators as a collaborator within the one or more predefined domains or as a collaborator outside of the one or more predefined domains;

generating a report on a proposed migration of one or more collaborators of the plurality of collaborators based on the one or more policies;

determining whether the proposed migration is accepted;

in response to determining the proposed migration is accepted, migrating the one or more collaborators of the plurality of collaborators from the source system to the target system based on the one or more policies; and in response to determining the proposed migration is not acceptable, determining whether there are changes to the proposed migration and in response to determining there are changes to the proposed migration, receiving the changes to the proposed migration and migrating the one or more collaborators of the plurality of collaborators from the source system to the target system based on the one or more policies and the received changes.

* * * * *